United States Patent
Lum et al.

(10) Patent No.: US 10,269,090 B2
(45) Date of Patent: Apr. 23, 2019

(54) RENDERING TO MULTI-RESOLUTION HIERARCHIES

(71) Applicant: NVIDIA CORPORATION, Santa Clara, CA (US)

(72) Inventors: Eric B. Lum, San Jose, CA (US); Henry Packard Moreton, Woodside, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 770 days.

(21) Appl. No.: 13/969,398

(22) Filed: Aug. 16, 2013

(65) Prior Publication Data
US 2015/0049104 A1    Feb. 19, 2015

(51) Int. Cl.
*G06T 11/40* (2006.01)
*G06T 1/60* (2006.01)
*G06T 15/04* (2011.01)

(52) U.S. Cl.
CPC .......... *G06T 1/60* (2013.01); *G06T 15/04* (2013.01)

(58) Field of Classification Search
CPC ......... G06T 15/04; G06T 1/60; G06T 15/005; G06T 11/001; G06T 11/40
USPC ....................................................... 345/552
See application file for complete search history.

(56) References Cited

U.S. PATENT DOCUMENTS

| | | | | |
|---|---|---|---|---|
| 6,426,750 B1 * | 7/2002 | Hoppe | ................ | G06T 17/20 345/423 |
| 7,746,352 B2 * | 6/2010 | Everitt | ................ | G06T 11/001 345/552 |
| 2009/0060043 A1 * | 3/2009 | Nuyttens | ................ | H04N 19/63 375/240.16 |
| 2009/0135190 A1 * | 5/2009 | Bakalash | ................ | G06T 15/005 345/506 |
| 2010/0158101 A1 * | 6/2010 | Wu | ................ | H04N 21/23424 375/240.01 |
| 2012/0281004 A1 * | 11/2012 | Shebanow | ................ | G09G 5/36 345/557 |

* cited by examiner

*Primary Examiner* — Gordon G Liu
(74) *Attorney, Agent, or Firm* — Artegis Law Group, LLP

(57) ABSTRACT

One embodiment of the present invention includes techniques for processing a multi-resolution hierarchy, where an application configures a ROP unit to render all the levels included in the multi-resolution hierarchy to a single composite render target. The ROP unit renders memory pages to the composite render target in pitch order. In contrast, the texture unit accesses the composite render target with memory pages in pitch order for each level of the hierarchy. The application configures the MMU to ensure that the composite render target is correctly interpreted by the texture unit. Notably, the MMU translates ROP unit virtual addresses and texture unit virtual addresses using different mapping strategies to the same physical address space. One advantage of the disclosed embodiments is that rendering to the multi-resolution hierarchy does not require the CPU to execute the state parameter changes that are associated with rendering the different hierarchical levels using prior-art techniques.

21 Claims, 7 Drawing Sheets

RENDERING TO MULTI-RESOLUTION HIERARCHIES

BACKGROUND OF THE INVENTION

Field of the Invention

Embodiments of the present invention relate generally to graphics processing and, more specifically, to rendering to multi-resolution hierarchies.

Description of the Related Art

A typical computer system includes a central processing unit (CPU) and a graphics processing unit (GPU). Some GPUs are capable of very high performance using a relatively large number of small, parallel execution threads on dedicated programmable hardware processing units. The specialized design of such GPUs usually allows these GPUs to perform certain tasks, such as rendering 3-D scenes, much faster than a CPU. However, the specialized design of these GPUs also limits the types of tasks that the GPU can perform. By contrast, the CPU is typically a more general-purpose processing unit and therefore can perform most tasks. Consequently, the CPU usually executes the overall structure of a software application and then configures the GPU to implement a graphics processing pipeline that transform 3-D images generated by the software application into rendered 2-D images.

For some classes of graphics algorithms it is desirable to render to a multi-resolution representation of a surface, such as mipmaps and multi-resolution shadowmaps. For instance, mipmaps enable an appropriate level of detail to be selected when transforming a 3-D image into a rendered 2-D image, thereby optimizing rendering speed and reducing aliasing artifacts. In operation, after a raster operations unit renders to a multi-resolution representation of a surface, a texture unit accesses the rendered surface to perform texturing operations. In general, the texture unit is configured to access hierarchical surfaces that have blocks of memory laid out in pitch order for each level of the hierarchy. In contrast, the ROP unit is configured to process and store hierarchical surfaces in the same manner in which the ROP unit processes non-hierarchical surfaces. In particular, the ROP unit stores surfaces with blocks in pitch order irrespective of the level of the hierarchy. Consequently, if the ROP unit was to process and store processed graphics data associated with multiple levels of the multi-resolution representation in a single surface, then the texture unit could incorrectly interpret the processed graphics data.

In one approach to ensuring that the processed graphics data in multi-resolution hierarchies is communicated correctly, the software application configures the graphics processing pipeline to render to each hierarchical level separately. As part of the configuration process for each hierarchical level, the software application sets the state parameters describing the render target to reflect the size of the hierarchical level. Further, as part of rendering to each hierarchical level, processing units included in the graphics processing pipeline process each graphics primitive.

For example, suppose that a software application were to configure the computer system to render to a two level mipmap chain. In such as scenario, the software application would set the state parameters describing the render target to reflect the size of the first level in the mipmap chain. The software application would then direct the graphics processing pipeline to render to the first level of the mipmap chain. Subsequently, the software application would set the state parameters describing the render target to reflect the size of the second level in the mipmap chain. The software application would then direct the graphics processing pipeline to render to the second level of the mipmap chain.

One drawback to the above approach is that the state parameter changes are executed by the CPU, not by the GPU in which the graphics processing pipeline is implemented. Consequently, for each change in resolution, the CPU is called upon to effect the necessary state parameter changes. As a general matter, the more times the CPU is called on during rendering, the more overall system performance is compromised. The overall system performance is further comprised because the software application renders to each hierarchical level separately. In particular, the processing results of certain units within the graphics processing pipeline, such as the tessellation processing unit and the vertex processing unit, do not typically vary with the size of the render target. However, since the above approach renders each hierarchical level separately, the tessellation processing unit and the vertex processing unit are re-executed for each hierarchical level. Consequently, these units recompute the same processing results for each hierarchical level.

Accordingly, what is needed in the art is a more effective technique to render to multi-resolution hierarchies.

SUMMARY OF THE INVENTION

One embodiment of the present invention sets forth a method for processing a multi-resolution hierarchy. The method includes associating a first composite virtual address with a first fragment that is included in a first hierarchical level of the multi-resolution hierarchy, mapping the first composite virtual address to a first physical address in a memory resource, rendering the first fragment to a composite render target based on the first composite virtual address, and mapping a first texture virtual address associated with the first hierarchical level to the first physical address.

One advantage of the disclosed approach is that software applications may correctly and efficiently process multi-resolution hierarchies. In particular, software applications may configure a ROP unit to render all the levels of the multi-resolution hierarchy to a single render target in a form that is correctly interpreted by a texture unit. Consequently, the software application does not incur the system performance degradation associated with prior-art techniques in which the CPU sets state parameters describing a separate render target for each level of hierarchy.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
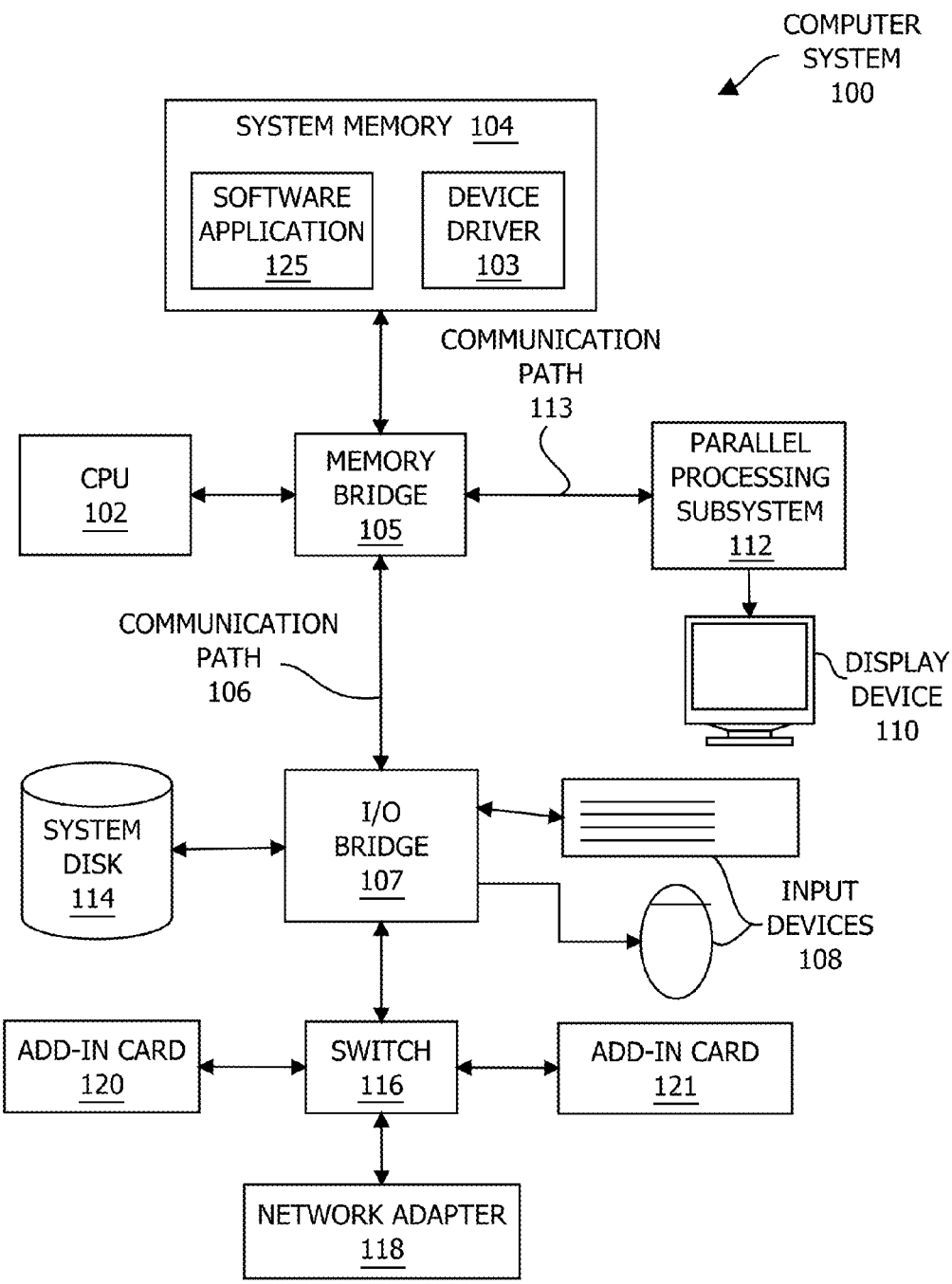
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbrige chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112. The system memory 104 also includes a software application 125 that executes on the CPU 102 and may issue commands that control the operation of the PPUs.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
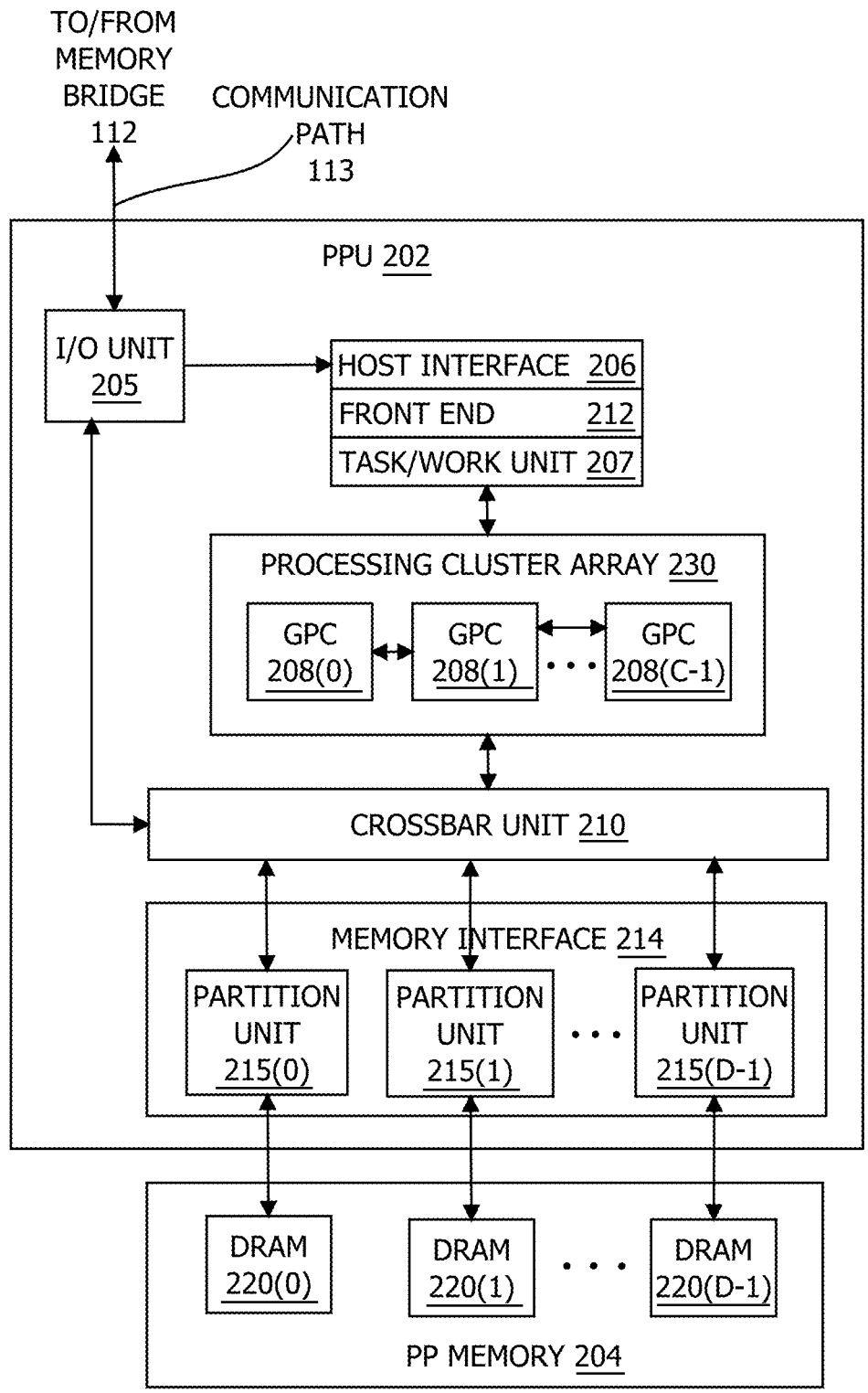
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3A:
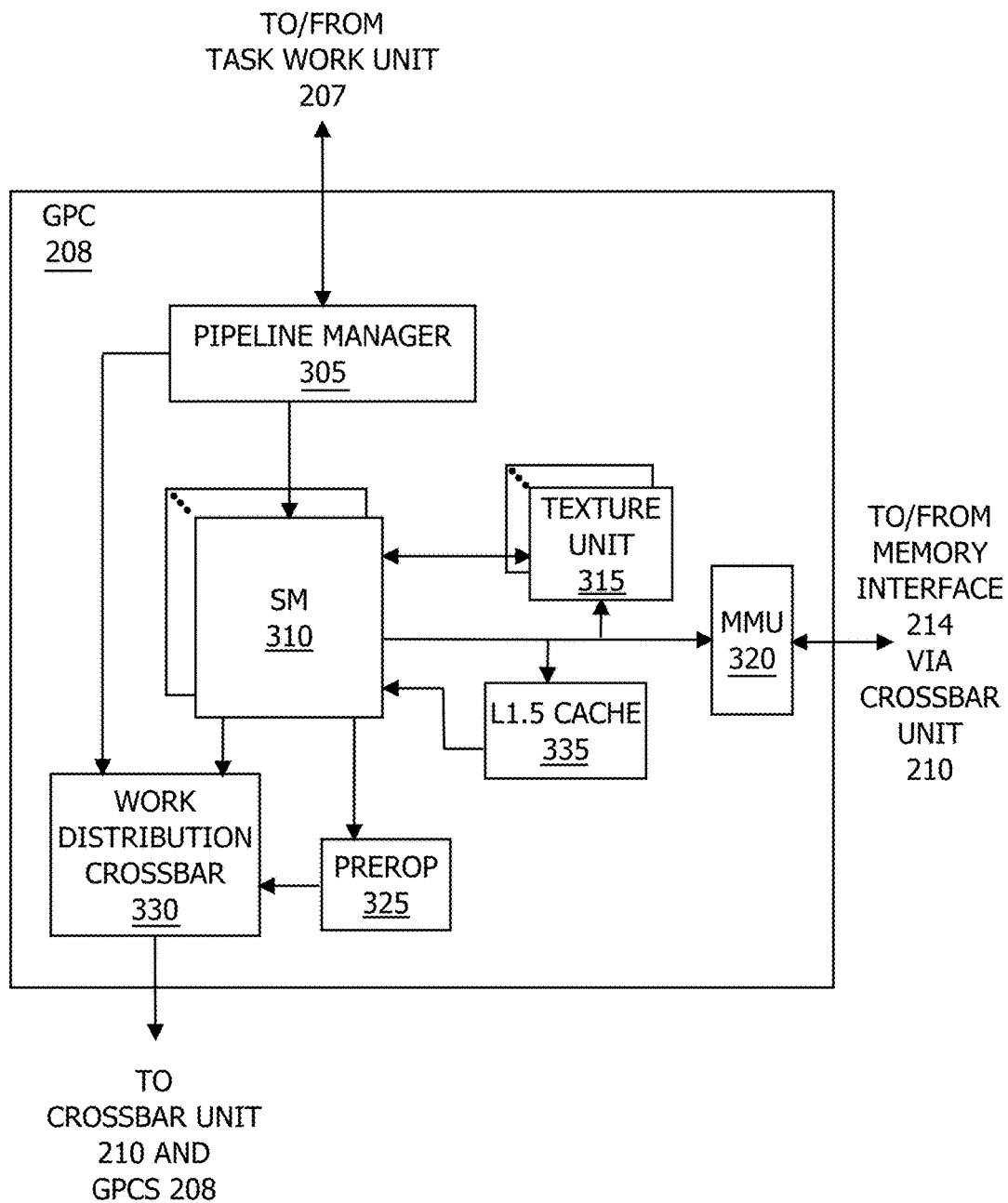
FIG. 3A is a block diagram of a general processing cluster included in the parallel processing unit of FIG. 2, according to one embodiment of the present invention.

FIG. 3A is a block diagram of a GPC 208 included in PPU 202 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3A, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3A, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3A in no way limits the scope of the present invention.

Graphics Pipeline Architecture

Figure 3B:
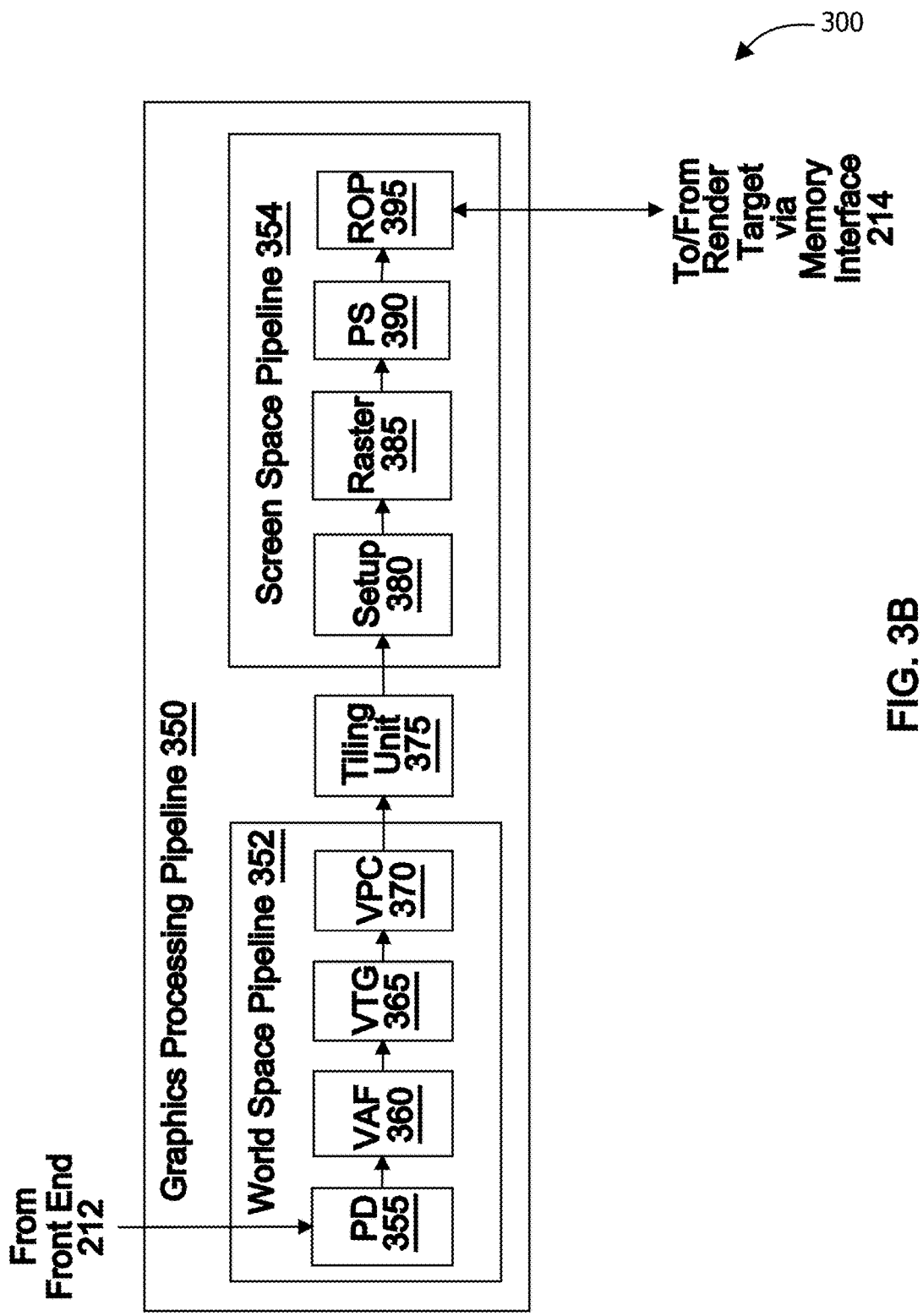
FIG. 3B is a conceptual diagram of a graphics processing pipeline that may be implemented within the parallel processing unit of FIG. 2, according to one embodiment of the present invention.

FIG. 3B is a conceptual diagram of a graphics processing pipeline 350 that may be implemented within PPU 202 of FIG. 2, according to one embodiment of the present invention. As shown, the graphics processing pipeline 350 includes, without limitation, a primitive distributor (PD) 355; a vertex attribute fetch unit (VAF) 360; a vertex, tessellation, geometry processing unit (VTG) 365; a viewport scale, cull, and clip unit (VPC) 370; a tiling unit 375, a setup unit (setup) 380, a rasterizer (raster) 385; a fragment processing unit, also identified as a pixel shading unit (PS) 390, and a raster operations unit (ROP) 395.

The PD 355 collects vertex data associated with high-order surfaces, graphics primitives, and the like, from the front end 212 and transmits the vertex data to the VAF 360.

The VAF 360 retrieves vertex attributes associated with each of the incoming vertices from shared memory and stores the vertex data, along with the associated vertex attributes, into shared memory.

The VTG 365 is a programmable execution unit that is configured to execute vertex shader programs, tessellation programs, and geometry programs. These programs process the vertex data and vertex attributes received from the VAF 360 and produce graphics primitives for further processing within the graphics processing pipeline 350. Although not explicitly shown, the VTG 365 may include, in some embodiments, one or more of a vertex processing unit, a tessellation initialization processing unit, a task generation unit, a task distributor, a topology generation unit, a tessellation processing unit, and a geometry processing unit.

The vertex processing unit is a programmable execution unit that is configured to execute vertex shader programs, lighting and transforming vertex data as specified by the vertex shader programs. For example, the vertex processing unit may be programmed to transform the vertex data from an object-based coordinate representation (object space) to an alternatively based coordinate system such as world space or normalized device coordinates (NDC) space. The vertex processing unit may read vertex data and vertex attributes that is stored in shared memory by the VAF and may process the vertex data and vertex attributes. The vertex processing unit 415 stores processed vertices in shared memory.

The tessellation initialization processing unit is a programmable execution unit that is configured to execute tessellation initialization shader programs. The tessellation initialization processing unit processes vertices produced by the vertex processing unit and generates graphics primitives known as patches. The tessellation initialization processing unit also generates various patch attributes. The tessellation initialization processing unit then stores the patch data and patch attributes in shared memory. In some embodiments, the tessellation initialization shader program may be called a hull shader or a tessellation control shader.

The task generation unit retrieves data and attributes for vertices and patches from shared memory. The task generation unit generates tasks for processing the vertices and patches for processing by later stages in the graphics processing pipeline 350.

The task distributor redistributes the tasks produced by the task generation unit. The tasks produced by the various instances of the vertex shader program and the tessellation initialization program may vary significantly between one graphics processing pipeline 350 and another. The task distributor redistributes these tasks such that each graphics processing pipeline 350 has approximately the same workload during later pipeline stages.

The topology generation unit retrieves tasks distributed by the task distributor. The topology generation unit indexes the vertices, including vertices associated with patches, and computes (U,V) coordinates for tessellation vertices and the indices that connect the tessellated vertices to form graphics primitives. The topology generation unit then stores the indexed vertices in shared memory.

The tessellation processing unit is a programmable execution unit that is configured to execute tessellation shader programs. The tessellation processing unit reads input data from and writes output data to shared memory. This output data in shared memory is passed to the next shader stage, the geometry processing unit 445 as input data. In some embodiments, the tessellation shader program may be called a domain shader or a tessellation evaluation shader.

The geometry processing unit is a programmable execution unit that is configured to execute geometry shader programs, thereby transforming graphics primitives. Vertices are grouped to construct graphics primitives for processing, where graphics primitives include triangles, line segments, points, and the like. For example, the geometry processing unit may be programmed to subdivide the graphics primitives into one or more new graphics primitives and calculate parameters, such as plane equation coefficients, that are used to rasterize the new graphics primitives.

The geometry processing unit transmits the parameters and vertices specifying new graphics primitives to the VPC 370. The geometry processing unit may read data that is stored in shared memory for use in processing the geometry data. The VPC 370 performs clipping, culling, and viewport transform to determine which graphics primitives are potentially viewable in the final rendered image and which graphics primitives are not potentially viewable. The VPC 370 then transmits processed graphics primitives to the tiling unit 375.

The tiling unit 375 is a graphics primitive sorting engine that resides between a world space pipeline 352 and a screen space pipeline 354, as further described herein. Graphics primitives are processed in the world space pipeline 352 and then transmitted to the tiling unit 375. The screen space is divided into cache tiles, where each cache tile is associated with a portion of the screen space. For each graphics primitive, the tiling unit 375 identifies the set of cache tiles that intersect with the graphics primitive, a process referred to herein as "tiling." After tiling a certain number of graphics primitives, the tiling unit 375 processes the graphics primitives on a cache tile basis, where graphics primitives associated with a particular cache tile are transmitted to the setup unit 380. The tiling unit 375 transmits graphics primitives to the setup unit 380 one cache tile at a time. Graphics primitives that intersect with multiple cache tiles are typically processed once in the world space pipeline 352, but are then transmitted multiple times to the screen space pipeline 354.

Such a technique improves cache memory locality during processing in the screen space pipeline 354, where multiple memory operations associated with a first cache tile access a region of the L2 caches, or any other technically feasible cache memory, that may stay resident during screen space processing of the first cache tile. Once the graphics primitives associated with the first cache tile are processed by the screen space pipeline 354, the portion of the L2 caches associated with the first cache tile may be flushed and the tiling unit may transmit graphics primitives associated with a second cache tile. Multiple memory operations associated with a second cache tile may then access the region of the L2 caches that may stay resident during screen space processing of the second cache tile. Accordingly, the overall memory traffic to the L2 caches and to the render targets may be reduced. In some embodiments, the world space computation is performed once for a given graphics primitive irrespective of the number of cache tiles in screen space that intersects with the graphics primitive.

The setup unit 380 receives vertex data from the VPC 370 via the tiling unit 375 and calculates parameters associated with the graphics primitives, including, without limitation, the color values, surface normal vectors, and transparency values at each vertex of the graphics primitive. The setup unit 380 then transmits processed graphics primitives to rasterizer 385.

The rasterizer 385 scan converts the new graphics primitives and transmits fragments and coverage data to the pixel shading unit 390. Additionally, the rasterizer 385 may be configured to perform z culling and other z-based optimizations.

The pixel shading unit 390 is a programmable execution unit that is configured to execute fragment shader programs, transforming fragments received from the rasterizer 385, as specified by the fragment shader programs. Fragment shader programs may shade fragments at pixel-level granularity, where such shader programs may be called pixel shader programs. Alternatively, fragment shader programs may shade fragments at sample-level granularity, where each pixel includes multiple samples, and each sample represents a portion of a pixel. Alternatively, fragment shader programs may shade fragments at any other technically feasible granularity, depending on the programmed sampling rate.

In various embodiments, the fragment processing unit 460 may be programmed to perform operations such as perspective correction, texture mapping, shading, blending, and the like, to produce shaded fragments that are transmitted to the ROP unit 395. The pixel shading unit 390 may read data that is stored in shared memory.

The ROP unit 395 is a processing unit that performs raster operations, such as stencil, z test, blending, and the like, and transmits pixel data as processed graphics data for storage in graphics memory via the memory interface 214, where graphics memory is typically structured as one or more render targets. The processed graphics data may be stored in graphics memory, parallel processing memory 204, or system memory 104 for display on display device 110 or for further processing by CPU 102 or parallel processing subsystem 112. In some embodiments, the ROP unit 395 is configured to compress z or color data that is written to memory and decompress z or color data that is read from memory. In various embodiments, the ROP unit 395 may be located in the memory interface 214, in the GPCs 208, in the processing cluster array 230 outside of the GPCs, or in a separate unit (not shown) within the PPUs 202.

The graphics processing pipeline may be implemented by any one or more processing elements within PPU 202. For example, one of the SMs 310 of FIG. 3A could be configured to perform the functions of one or more of the VTG 365 and the pixel shading unit 390. The functions of the PD 355, the VAF 360, the VPC 450, the tiling unit 375, the setup unit 380, the rasterizer 385, and the ROP unit 395 may also be performed by processing elements within a particular GPC 208 in conjunction with a corresponding partition unit 215. Alternatively, graphics processing pipeline 350 may be implemented using dedicated fixed-function processing elements for one or more of the functions listed above. In various embodiments, PPU 202 may be configured to implement one or more graphics processing pipelines 350.

In some embodiments, the graphics processing pipeline 350 may be divided into a world space pipeline 352 and a screen space pipeline 354. The world space pipeline 352 processes graphics objects in 3D space, where the position of each graphics object is known relative to other graphics objects and relative to a 3D coordinate system. The screen space pipeline 354 processes graphics objects that have been projected from the 3D coordinate system onto a 2D planar surface representing the surface of the display device 110. For example, the world space pipeline 352 could include pipeline stages in the graphics processing pipeline 350 from the PD 355 through the VPC 370. The screen space pipeline 354 could include pipeline stages in the graphics processing pipeline 350 from the setup unit 380 through the ROP unit 395. The tiling unit 375 would follow the last stage of the world space pipeline 352, namely, the VPC 370. The tiling unit 375 would precede the first stage of the screen space pipeline 354, namely, the setup unit 380.

In some embodiments, the world space pipeline 352 may be further divided into an alpha phase pipeline and a beta phase pipeline. For example, the alpha phase pipeline could include pipeline stages in the graphics processing pipeline 350 from the PD 355 through the task generation unit. The beta phase pipeline could include pipeline stages in the graphics processing pipeline 350 from the topology generation unit through the VPC 370. The graphics processing pipeline 350 performs a first set of operations during processing in the alpha phase pipeline and a second set of operations during processing in the beta phase pipeline. As used herein, a set of operations is defined as one or more instructions executed by a single thread, by a thread group, or by multiple thread groups acting in unison.

In a system with multiple graphics processing pipeline 350, the vertex data and vertex attributes associated with a set of graphics objects may be divided so that each graphics processing pipeline 350 has approximately the same amount of workload through the alpha phase. Alpha phase processing may significantly expand the amount of vertex data and vertex attributes, such that the amount of vertex data and vertex attributes produced by the task generation unit is significantly larger than the amount of vertex data and vertex attributes processed by the PD 355 and VAF 360. Further, the task generation unit associated with one graphics processing pipeline 350 may produce a significantly greater quantity of vertex data and vertex attributes than the task generation unit associated with another graphics processing pipeline 350, even in cases where the two graphics processing pipelines 350 process the same quantity of attributes at the beginning of the alpha phase pipeline. In such cases, the task distributor redistributes the attributes produced by the alpha phase pipeline such that each graphics processing pipeline 350 has approximately the same workload at the beginning of the beta phase pipeline.

Please note, as used herein, references to shared memory may include any one or more technically feasible memories, including, without limitation, a local memory shared by one or more SMs 310, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

Processing Multi-Resolution Hierarchies

Again, the software application 125 configures the graphics rendering pipeline 350 to perform various operations related to generating pixel data based on graphics data supplied by CPU 102 and/or system memory 104. One important class of graphics algorithms involves rendering processed graphics data to a multi-resolution representation of a surface and then accessing this surface to perform further graphics operations. In one embodiment, the software application 125 configures the graphics processing pipeline 350 to perform operations related to such graphics algorithms. Advantageously, the software application 125 strategically leverages existing functionality included in the parallel processing subsystem 112 to process a multi-resolution representation of a surface both accurately and efficiently.

More specifically, the software application 125 configures the ROP unit 395 to write data associated with a multi-resolution hierarchy to a composite render target that includes all of the levels in the hierarchy. Further, the software application 125 configures the texture unit 315 to access the composite render target as a multi-resolution hierarchy. Notably, the software application 125 configures the parallel processing subsystem 112 to overcome differences between the format conventionally written by the ROP unit 395 and the format conventionally read by the texture unit 315.

The ROP unit 395 outputs processed graphics data with blocks laid out in pitch order for each render target, irrespectively of any associated hierarchical level. In other words, the ROP unit 395 writes blocks, such as pages, of processed graphics data row-by-row with respect to the render target. In operation, the ROP unit 395 sequentially writes data to the blocks corresponding to the first row in the render target. Subsequently, the ROP unit 395 sequentially writes data to the blocks corresponding to the second row in the render target, and so forth. By contrast, the texture unit 315 reads the processed graphics data corresponding to multi-level hierarchies in pitch order for each hierarchical level. In operation, the texture unit 315 sequentially reads data from the blocks corresponding to the first row included in the first hierarchical level. Subsequently, the texture unit 315 sequentially reads data from the blocks corresponding to the first row included in the second hierarchical level, and so forth.

Advantageously, the software application 125 configures the MMU 320 to appropriately map virtual addresses associated with the ROP unit 395 and virtual addresses associated with the texture unit 315 to the same physical addresses. This complementary mapping ensures that the texture unit 315 interprets the processed graphics data as intended by the ROP unit 395. In one embodiment, the software application 125 configures the page table entries (PTEs) included in the MMU 320 such that the layout of the graphics data in the PP memory 204 matches the layout of the virtual addresses associated with the texture unit 315. In this embodiment, the layout of the virtual addresses associated with the ROP unit 395 does not match the layout of the virtual addresses associated with the PP memory 204. In alternate embodiments, the software 125 application may configure the MMU 320 such that the layout of the graphics data in the PP memory 204 matches the layout of the virtual addresses associated with the ROP unit 395. In such an embodiment, the layout of the virtual addresses associated with the texture unit 315 does not match the layout of the virtual addresses associated with the PP memory 305.

As persons skilled in the art will understand, embodiments of the invention include any mapping that ensures that the ROP 395 and the texture unit 315 interpret data associated with the composite render target in the same manner. Further, the composite render target may be stored in any memory accessible to the parallel processing subsystem 112.

The software application 125 also leverages functionality included in the VTG 365 to streamline the graphics processing pipeline 350. In particular, the VTG 365 includes functionality to specify the resolution of each viewport to which a graphics primitive is drawn. In addition, the VTG 365 includes broadcast functionality to send each graphics primitive to multiple viewports. In operation, the software application 125 configures the VTG 365 to create a different viewport within the composite render target for each hierarchical level in the multi-resolution hierarchy. Further, the software application 125 directs the VTG 365 to set the resolution of each viewport to match the resolution of the corresponding hierarchical level. In addition, the software application 125 configures the VTG 365 to send each graphics primitive to each viewport. Consequently, both the tessellation processing unit and the vertex processing unit execute once per graphics primitive. In contrast, in prior-art techniques, both the tessellation processing unit and the vertex processing unit execute once per hierarchical level per graphics primitive.

The pixel shading unit 390 and the ROP 395 process the entire composite render target. Consequently, the pixel shading unit 309 and the ROP unit 395 execute once per hierarchical level per fragment, processing the fragments at the resolution defined in the viewports. Notably, the ROP unit 395 processes the hierarchical levels represented by the composite render target at the correct resolutions in a single rendering pass. Therefore, the software application 125 does not change the state parameters describing the render target. By contrast, in prior-art techniques the ROP unit 395 renders each hierarchical level separately and the software application calls upon the CPU to change the state parameters describing the render target between rendering each sequential hierarchical level.

Figure 4:
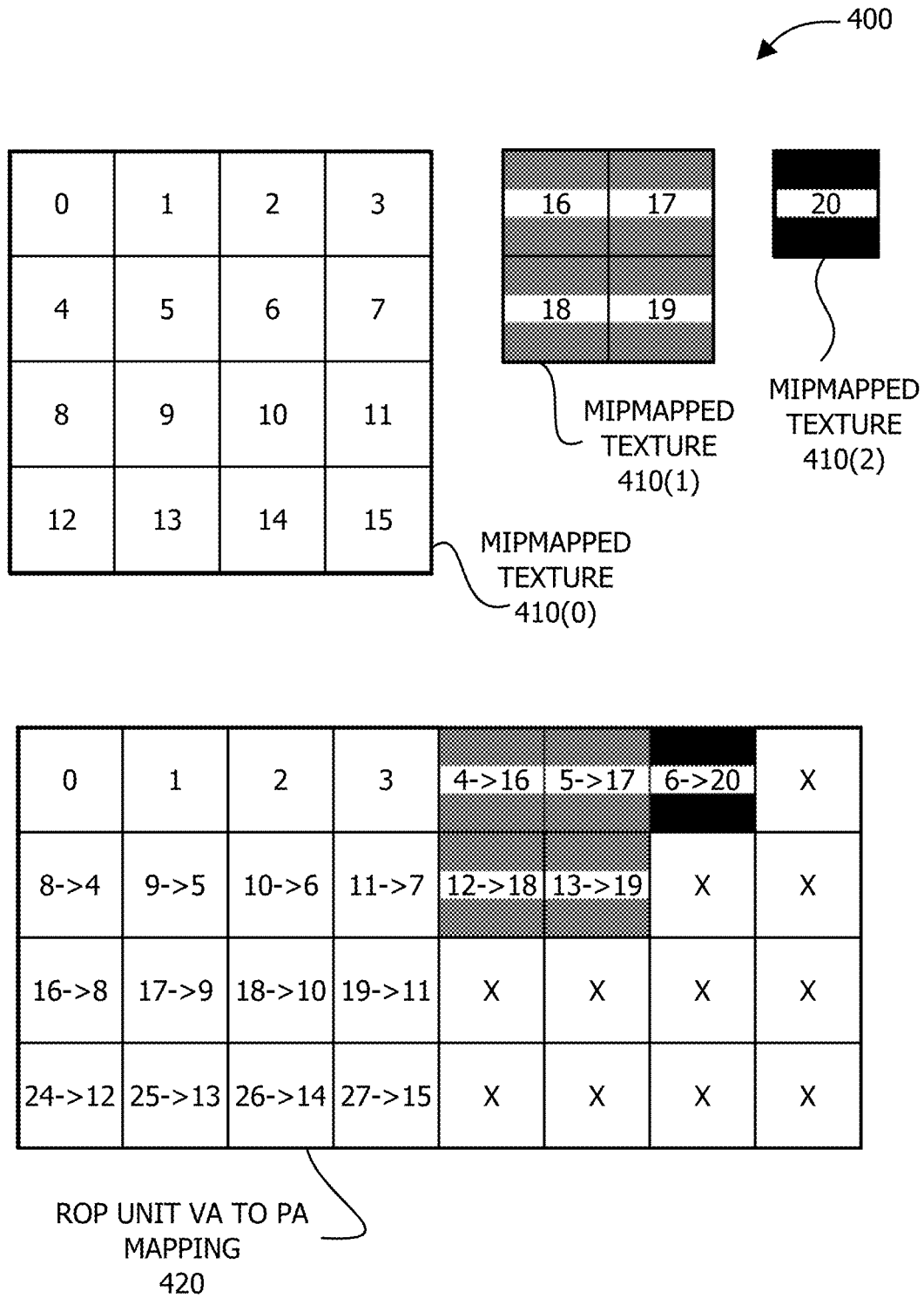
FIG. 4 is a conceptual diagram of a mipmapped texture that the graphics processing pipeline of FIG. 3B may be configured to process, according to one embodiment of the present invention.

FIG. 4 is a conceptual diagram of a mipmapped texture 410 that the graphics processing pipeline 350 of FIG. 3B may be configured to process, according to one embodiment of the present invention. As shown, the mipmapped texture 410 is a multi-resolution hierarchy that includes three hierarchical levels. Each numbered square included in the mipmapped texture 410 represents a page of the PP memory 204.

As shown, the mipmapped texture 410(0) is the top level included in the multi-resolution hierarchy and includes 16 pages, 0 through 15. The mipmapped texture 410(1) is the next level included in the hierarchy and includes 4 pages, 16 through 19. The mipmapped texture 410(2) is the final level included in the hierarchy and includes 1 page, 20. The layout shown for the mipmapped texture 410 corresponds to the layout of the mipmapped texture in both the PP memory 204 and the virtual address space associated with the texture unit 315.

To generate the mipmapped texture 410, the software application 125 configures the ROP 395 to render graphics data to a composite render target. The composite render target is large enough to include all of the levels included in the mipmapped texture 410. The ROP unit 395 processes graphics data associated with each level of the mipmapped texture 410 and writes the data to the composite render target. As disclosed herein, the ROP unit 395 writes pages of processed graphics data with pages in pitch order for the entire composite render target without regard to the associated hierarchical levels. In particular, the ROP unit 395 writes the pages of processed graphics data in ascending sequential order.

Advantageously, the software application 125 configures the MMU 320 to ensure that the texture unit 315 correctly interprets the processed graphics data that the ROP unit 395 renders to the composite render target. In particular, the software application 125 configures the MMU 320 to implement a ROP unit virtual address (VA) to physical address (PA) mapping 420. As shown, the MMU 320 maps the ROP unit 395 virtual addresses 0 through 3, corresponding to the first row of pages included in the first level of the mipmapped texture 410(0), to the physical addresses 0 through 3. As also shown, the MMU 320 maps the ROP unit 395 virtual addresses 4 and 5, corresponding to the first row of pages included in the second level mipmapped texture 410(1), to the physical addresses 16 and 17. Similarly, the MMU 320 maps the ROP unit 395 virtual address 6, corresponding to the first row of pages included in the third level mipmapped texture 410(2), to the physical address 20.

Subsequently, as shown, the MMU 320 maps the ROP unit 395 addresses corresponding to the next 3 rows included in the mipmapped texture 410. Since various levels included in the mipmapped textures 410 do not fully cover the single composite render target, there are some gaps in the virtual addresses associated with the ROP unit 395. These virtual addresses are depicted in the ROP unit VA to PA mapping 420 by crosses, and are not backed by the PP memory 204.

Figure 5:
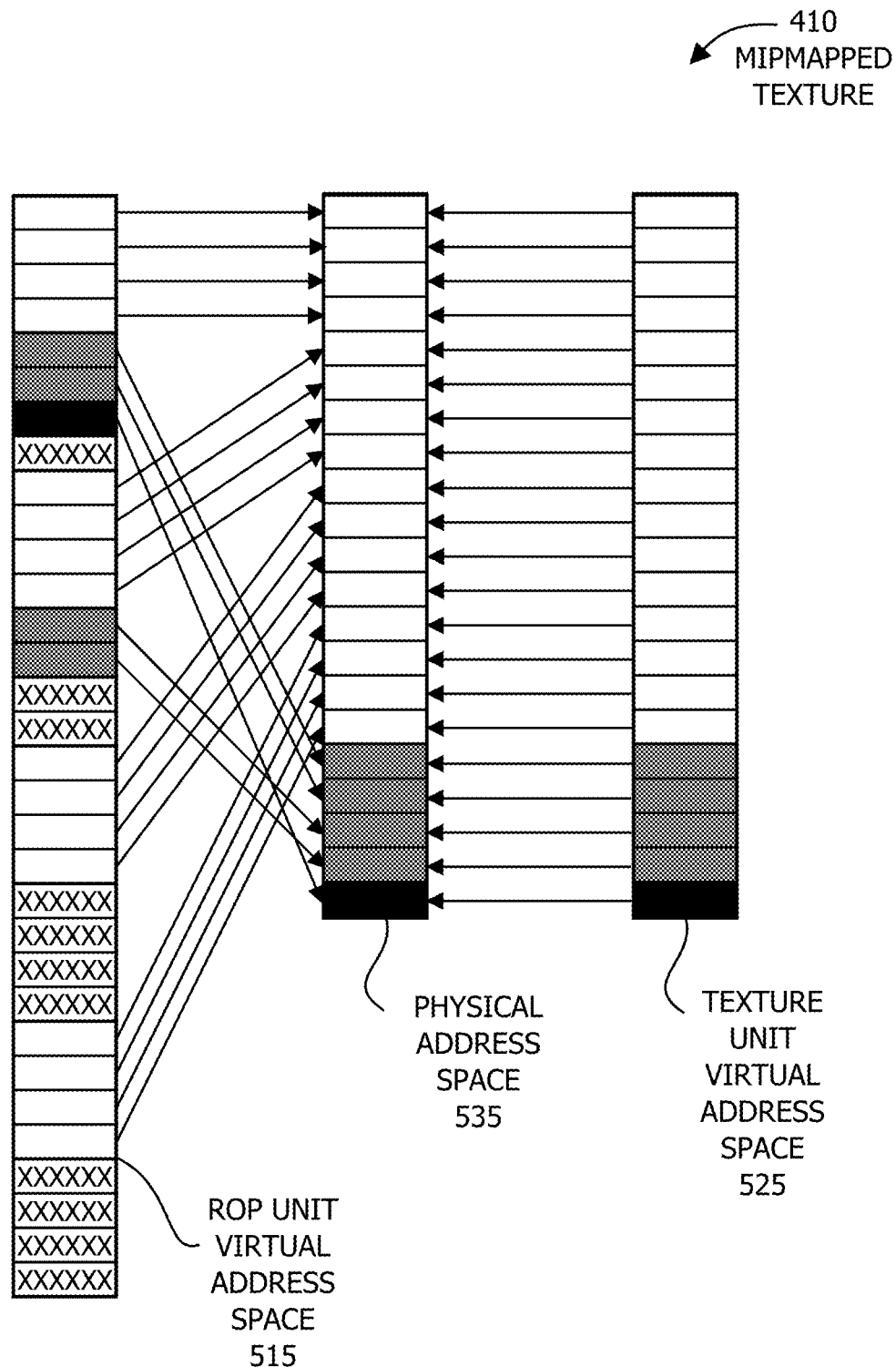
FIG. 5 is a conceptual diagram illustrating virtual address spaces and a physical address space corresponding to the mipmapped texture of FIG. 4, according to one embodiment of the present invention.

FIG. 5 is a conceptual diagram illustrating virtual address spaces and a physical address space 535 corresponding to the mipmapped texture 410 of FIG. 4, according to one embodiment of the present invention. The ROP unit virtual address space 515 corresponds to the addresses with which the ROP unit 395 accesses the mipmapped texture 410. Similarly, the texture unit virtual address space 525 corresponds to the addresses with which the texture unit 315 accesses the mipmapped texture 410. Both the ROP unit virtual address space 515 and the texture unit virtual address space 525 map to the same physical address space 535 in the PP memory 204.

As shown, the layout of the texture unit virtual address space 525 matches the layout of the physical address space 535. More specifically, if two virtual addresses are contiguous in the texture unit virtual address space 525, then the corresponding physical addresses in the physical address space 535 are also contiguous. By contrast, the layout of the ROP unit virtual address space 515 does not match the layout of the physical address space 535. For instance, the virtual addresses in the ROP unit virtual address space 515 corresponding to the first level of the mipmapped texture 410(0) are not all contiguous. As shown, these virtual addresses of pages are broken into two groups corresponding to the pitch order of the entire composite render target. Advantageously, the mapping of the ROP unit virtual address space 515 and the texture unit virtual address space 525 to the physical address space 535 introduces an indirect mapping between these two virtual address spaces. The indirect mapping between the ROP unit virtual address space 515 and the texture unit virtual address space 525 enables the ROP unit 395 and the texture unit 315 to correctly execute the software application 125. In alternate embodiments, the layout of the texture unit virtual address space may not match the layout of the physical address space. In particular, if two virtual addresses are contiguous in the texture unit virtual address space, then the corresponding physical addresses in the physical address space may not be contiguous.

Figure 6:
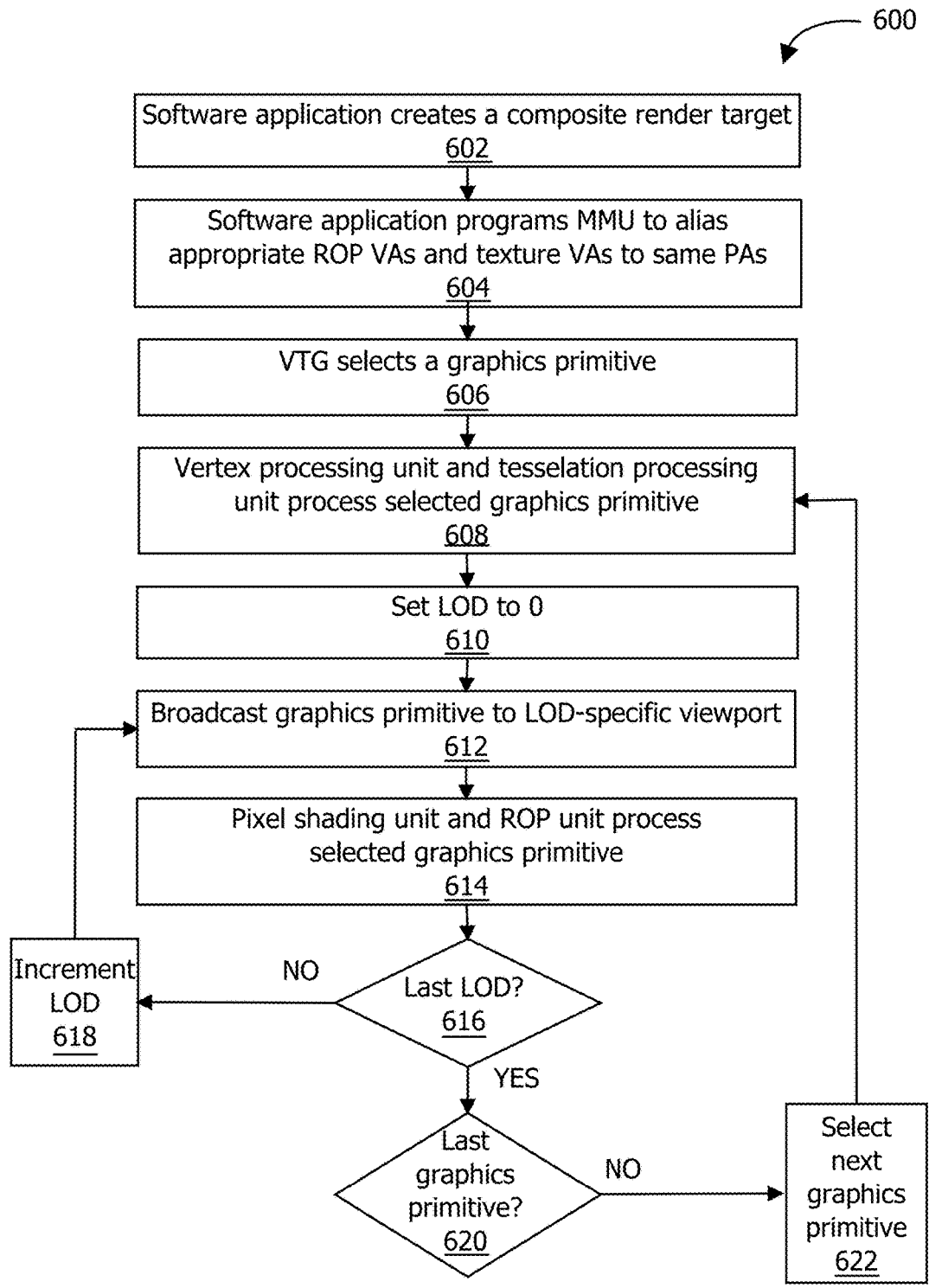
FIG. 6 is a flow diagram of method steps for rendering to multi-resolution hierarchies, according to one embodiment of the present invention.

FIG. 6 is a flow diagram of method steps for rendering to multi-resolution hierarchies, according to one embodiment of the present invention. Although the method steps are described with reference to the systems of FIGS. 1-5, persons skilled in the art will understand that any system configured to implement the method steps, in any order, falls within the scope of the present invention.

As shown, a method 600 begins at step 602, where the software application 125 creates a composite render target. In particular, the composite render target is large enough to include all of the levels included in a multi-resolution hierarchy. As step 604, the software application 125 programs the MMU 320 such that texture unit 315 virtual addresses and ROP unit 395 virtual addresses associated with the same data in the multi-resolution hierarchy point to the same physical address space. This remapping may be accomplished in any technically feasible fashion. In one embodiment, the texture unit 315 accesses pages with virtual addresses that are laid out in pitch order for each level of the hierarchy included in the multi-resolution hierarchy. By contrast, the ROP unit 395 accesses pages with virtual addresses that are laid out in pitch order for the composite render target. In such an embodiment, the software application 125 may program the MMU 320 to remap the ROP unit 395 virtual addresses such that the ROP unit 395 virtual addresses and the texture unit 315 virtual addresses point to the same physical address space.

At step 606, the VTG 365 selects a graphics primitive. At step 608, the vertex processing unit and the tessellation processing unit process the selected graphics primitive. Advantageously, the vertex processing unit and the tessellation processing unit process each graphics primitive once. In contrast, in prior-art techniques, the vertex processing unit and the tessellation processing unit process each graphics primitive once for each level included in the multi-resolution hierarchy. As step 610, the VTG 365 selects the level of detail (LOD) that corresponds to the highest resolution level included in the multi-resolution hierarchy.

At step 612, the VTG 365 sets the resolution of a viewport to the resolution of the selected LOD. Subsequently, the VTG 365 broadcasts the selected graphics primitive to the LOD-specific viewport. At step 614, the pixel shading unit 390 and the ROP unit 395 process the geometry primitive with respect to the selected LOD. Again, the selected LOD corresponds to a specific hierarchical level included in the multi-resolution hierarchy. Advantageously, the ROP unit 395 writes processed graphics data corresponding to the selected LOD to the composite render target without calling upon the CPU 102 to effect the expensive state changes associated with prior-art techniques.

At step 616, if the graphics processing pipeline 350 determines that the selected LOD is not the last LOD associated with the multi-resolution hierarchy, then the method 600 proceeds to step 618. At step 618, the graphics processing pipeline 350 selects the next LOD, and the method 600 returns to step 612. The graphics processing pipeline 350 cycles through steps 612 through 618, rendering to a different LOD-specific viewport until each level included in the multi-resolution hierarchy has been processed. If, at step 616, the graphics processing pipeline 350 determines that the selected LOD is the last LOD associated with the multi-resolution hierarchy, then method 600 proceeds to step 620.

At step 620, if the graphics processing pipeline 350 determines that the selected graphics primitive is not the last graphics primitive associated with the multi-resolution hierarchy, then the method 600 proceeds to step 622. At step 622, the graphics processing pipeline 350 selects the next graphics primitive, and the method 600 returns to step 608. The graphics processing pipeline 350 cycles through steps 608 through 622, rendering each graphics primitive at each LOD until all of the graphics primitives included in the multi-resolution hierarchy have been processed.

In sum, by implementing the disclosed techniques, software applications may configure the computer system to both efficiently create and accurately access multi-resolution hierarchies stored as a single composite surface. To avoid changing state parameters describing render targets, the software unit configures the ROP unit to render to a single composite surface. The composite surface is large enough to include all of the hierarchical levels included in the multi-resolution hierarchy. Notably, the ROP unit writes to the composite surface with pages in pitch order for the composite surface. In contrast, the texture unit is configured to process multi-resolution hierarchies with pages in pitch order for each level of the hierarchy. To ensure that the texture unit correctly interprets the processed graphics data written by the ROP unit, the software application appropriately configures the MMU. More specifically, the software application configures the MMU to map a ROP unit virtual address associated with a fragment included in a particular level and a texture unit virtual address associated with the same fragment to the same physical address. The indirection introduced by this mapping enables the ROP unit and the tiling unit to access the same data in physical memory using separate virtual address spaces tailored to the respective access methods of the processing units. In one example, the software application configures the MMU to map the ROP unit virtual addresses to physical addresses corresponding to the conventional physical memory representation of multi-resolution hierarchical surfaces—pitch order for each level of the hierarchy.

Further, since the ROP renders to a single composite surface, the software application may configure other units in the graphics processing pipeline to render to multi-resolution hierarchies more efficiently. In one example, the geometry processing unit broadcasts each graphics primitive to multiple viewports (resolutions). In operation, upon receiving a graphics primitive, both the vertex processing unit and the tessellation processing unit execute only once. Subsequently, the pixel shading unit executes once for each hierarchical level—processing the fragments associated with the graphics primitive at the appropriate resolution based on the viewport.

One advantage of the techniques disclosed herein is that correctly processing multi-resolution hierarchies no longer requires the CPU to set state parameters describing the render target for each level of hierarchy. Consequently, the system performance is improved compared to systems that use prior-art techniques for rendering to multi-resolution hierarchies. Further, certain units in the graphics processing pipeline, such as the tessellation processing unit and the vertex processing unit are executed once for each graphics primitive. In contrast, using prior-art techniques, such processing units are executed for each graphics primitive at each hierarchical level. Reducing the number of times these processing units are executed further optimizes the system performance compared to prior-art techniques.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A computer-implemented method for processing a multi-resolution hierarchy, the method comprising:
   associating a first composite virtual address with a first fragment that is included in a first hierarchical level of the multi-resolution hierarchy;
   mapping the first composite virtual address to a first physical address in a memory resource;
   rendering the first fragment to a composite render target based on the first composite virtual address, wherein the composite render target includes all hierarchical levels of the multi-resolution hierarchy; and
   mapping a first texture virtual address associated with the first hierarchical level to the first physical address.

2. The method of claim 1, further comprising:
   computing the first texture virtual address based on the location of the first fragment in the first hierarchical level; and
   accessing the memory resource based on the first texture virtual address.

3. The method of claim 2, further comprising:
   associating a second composite virtual address with a second fragment that is included in a second hierarchical level of the multi-resolution hierarchy;
   mapping the second composite virtual address to a second physical address in the memory resource;
   rendering the second fragment to the composite render target based on the second composite virtual address; and
   mapping a second texture virtual address associated with the second hierarchical level to the second physical address.

4. The method of claim 3, wherein the first texture virtual address and the second texture virtual address are contiguous in a texture virtual address space.

5. The method of claim 4, wherein the first composite virtual address and the second composite virtual address are non-contiguous in a composite virtual address space.

6. The method of claim 1, wherein the size of the first hierarchical level is different than the size of the second hierarchical level.

7. The method of claim 1, wherein rendering the first fragment comprises computing at least one of a color value and a depth value.

8. The method of claim 1, wherein the first hierarchical level comprises a level of a mipmap.

9. The method of claim 1, wherein the first hierarchical level comprises a level of a shadowmap.

10. The computer-implemented method of claim 1, further comprising:
generating a different viewport within the composite render target for each level of the multi-resolution hierarchy; and
setting the resolution of each different viewport to match a corresponding level of the multi-resolution hierarchy.

11. A computer-readable storage medium including instructions that, when executed by a processing unit, cause the processing unit to process a multi-resolution hierarchy by performing the steps of:
associating a first composite virtual address with a first fragment that is included in a first hierarchical level of the multi-resolution hierarchy;
mapping the first composite virtual address to a first physical address in a memory resource;
rendering the first fragment to a composite render target based on the first composite virtual address, wherein the composite render target includes all hierarchical levels of the multi-resolution hierarchy; and
mapping a first texture virtual address associated with the first hierarchical level to the first physical address.

12. The computer-readable storage medium of claim 11, further comprising:
computing the first texture virtual address based on the location of the first fragment in the first hierarchical level; and
accessing the memory resource based on the first texture virtual address.

13. The computer-readable storage medium of claim 12, further comprising:
associating a second composite virtual address with a second fragment that is included in a second hierarchical level of the multi-resolution hierarchy;
mapping the second composite virtual address to a second physical address in the memory resource;
rendering the second fragment to the composite render target based on the second composite virtual address; and
mapping a second texture virtual address associated with the second hierarchical level to the second physical address.

14. The computer-readable storage medium of claim 13, wherein the first texture virtual address and the second texture virtual address are contiguous in a texture virtual address space.

15. The computer-readable storage medium of claim 14, wherein the first composite virtual address and the second composite virtual address are non-contiguous in a composite virtual address space.

16. The computer-readable storage medium of claim 11, wherein the size of the first hierarchical level is different than the size of the second hierarchical level.

17. The computer-readable storage medium of claim 11, wherein rendering the first fragment comprises computing at least one of a color value and a depth value.

18. The computer-readable storage medium of claim 11, wherein the first hierarchical level comprises a level of a mipmap.

19. The computer-readable storage medium of claim 11, wherein the first hierarchical level comprises a level of a shadowmap.

20. A system configured to process a multi-resolution hierarchy, the system comprising:
a memory management unit configured to:
associate a first composite virtual address with a first fragment that is included in a first hierarchical level of the multi-resolution hierarchy,
map the first composite virtual address to a first physical address in a memory resource, and
map a first texture virtual address associated with the first hierarchical level to the first physical address; and
a raster operations unit configured to:
render the first fragment to a composite render target based on the first composite virtual address, wherein the composite render target includes all hierarchical levels of the multi-resolution hierarchy.

21. The system of claim 20, further comprising:
a texture unit configured to:
compute the first texture virtual address based on the location of the first fragment in the first hierarchical level, and
access the memory resource based on the first texture virtual address.

* * * * *